United States Patent [19]

Horie

[11] Patent Number: 5,070,491
[45] Date of Patent: Dec. 3, 1991

[54] ERROR SIGNAL GENERATING CIRCUIT

[75] Inventor: Kiyoshi Horie, Yokohama, Japan

[73] Assignee: Kabushiki Kaisha CSK, Tokyo, Japan

[21] Appl. No.: 329,789

[22] PCT Filed: Jun. 23, 1988

[86] PCT No.: PCT/JP88/00626

§ 371 Date: Apr. 21, 1989

§ 102(e) Date: Apr. 21, 1989

[87] PCT Pub. No.: WO88/10495

PCT Pub. Date: Dec. 29, 1988

[51] Int. Cl.$^5$ ............................................. G11B 7/00
[52] U.S. Cl. ........................... 369/44.34; 369/44.35;
369/44.42; 369/44.29; 250/201.5
[58] Field of Search ............. 369/54, 58, 44.29, 44.35,
369/32, 124, 44.28, 44.34, 44.26, 44.42, 44.27;
250/201.5

[56] References Cited

U.S. PATENT DOCUMENTS 4,517,666  5/1985  Ando .................................. 369/44.24
4,821,251  4/1989  Hosoya ................................. 369/54

FOREIGN PATENT DOCUMENTS 56-47932    4/1981  Japan .
56-647934   4/1981  Japan .
59-33673    2/1984  Japan .
59-33674    2/1984  Japan .
59-33675    2/1984  Japan .
59-203276  11/1984  Japan .
62-180568   8/1987  Japan .

OTHER PUBLICATIONS

Electronic Component and Application 6(1984), 4, pp. 209-14.

Primary Examiner—Roy N. Envall, Jr.
Assistant Examiner—Thang V. Tran
Attorney, Agent, or Firm—Lackenbach Siegel Marzullo & Aronson

[57] ABSTRACT

An error signal generating circuit which generates an error signal based on a read signal from an optical recording medium, which circuit comprises an error detection means responsive to the read signal to output the error signal; a disorder detection means responsive to the read signal to detect disorder; a signal hold means holding an output from the error detection means just before the disorderly state has occurred, during a period when the output from the disorder detection means represents the disorderly state; and a switching means responsive to the output from the error detection means and the output from the signal hold means to selectively supply the output from the hold means when the output from the disorder detection means represents the disorderly state and selectively supply the output from the error detection means when the output from the disorder detection means does not represent the disorderly state.

4 Claims, 7 Drawing Sheets

ERROR SIGNAL GENERATING CIRCUIT

TECHNICAL FIELD

This invention relates to an error signal generating circuit applicable to the reading of the optical recording medium which effects control of a servo mechanism utilizing a focus or tracking error signal.

BACKGROUND ART

An optical recording medium, such as a card type optical memory, which has a high density data recording capability and is capable of being carriable, has recently attracted the attention of many people.

In the optical recording medium such as a card type optical memory, recording is done by forming optically (or magnetooptically) changed states according to data to be recorded at discrete spots on the surface thereof, and then a light beam, such as a laser beam, is projected thereonto to read the changed states.

Specifically, fine unevenness or light and dark patterns are provided on a surface of the optical memory card onto which a light beam is projected to recognize the recorded data according to the difference of reflectivity, refractive index, or transmissivity of the medium to the projected light beam. Alternatively, the recording medium may be photothermo-magnetically recorded and the recorded data may be read depending upon the change of polarization of the projected light due to the magnetooptical effect.

The optical memory card has a clock track for enabling synchronization with data reading/writing and a tracking guide line functioning as a reference for a light beam from a reading optical system to accurately trace a track. The track and line are provided for each of the data track in the conventional optical memory card and juxtaposed each other.

In the tracking adjustment for light irradiated onto the optical recording medium, a tracking error signal is generated, based on the output from the photodetector for tracking error detection and a tracking servo mechanism is controlled, based on the tracking error signal to automatically keep the optimum tracking conditions.

In the focus adjustment for light irradiated onto the optical recording medium, a focus error signal is generated, based on the output from the photodetector for focus error detection and a focus servo mechanism is controlled according to the focus error signal to keep the optimum focus conditions.

However, if there is a dust or scar on the optical recording medium, it may possibly occur that light is not incident upon the photodetector for the error detection. In this case, a false error signal is generated and normal reading (or writing) is not attained.

DISCLOSURE OF THE INVENTION

It is an object of the present invention to provide an error signal generating circuit which is capable of carrying out the reading of data without any substantial trouble otherwise normal focus or tracking control would not effected due to dust or scar on an optical recording medium.

The present invention features, as illustrated in FIG. 1, an error signal generating circuit which generates an error signal based on a read signal from an optical recording medium, which circuit comprises:

an error detection means responsive to the read signal to output the error signal;

a disorder detection means responsive to the read signal to detect disorder;

a signal hold means holding an output from the error detection means just before the disorderly state has occurred, during a period when the output from the disorder detection means represents the disorderly state; and a switching means responsive to the output from the error detection means and the output from the signal hold means to selectively supply the output from the hold means when the output from the disorder detection means represents the disorderly state and selectively supply the output from the error detection means when the output from the disorder detection means does not represent the disorderly state.

In one embodiment of the present invention, the error signal is a signal for controlling the focus of light irradiated onto the optical recording medium.

In another embodiment of the present invention, the error signal is a signal for controlling the tracking of light irradiated onto the optical recording medium.

In a further embodiment of the present invention, the signal hold means comprises a delay element for delaying the output from the error detection means for a predetermined time and a level hold circuit for holding an output level of the delay element when the disorderly state is detected by the disorder detection means. The delay length of the delay element will suffice if a signal that the signal hold means holds in response to the disorder detection by the disorder detection means is assured to be a signal before the occurrence of the disorderly state.

According to the present invention, when light is hindered to be incident upon the photodetector for the error detection, an error signal immediately before this has occurred is held until a normal good order has been restored. Throughout the disorderly time, the error signal being held is used as an error signal. Generally, it is unusual that such a disorderly state caused by dust or scar does not last so long, the error signal immediately before the occurrence of the disorderly state may be used instead of the regular error signal without causing substantial problems.

The detection of the disorderly state is effected by summing the outputs from the photodetector for the error detection and detecting that the sum signal becomes lower than the previously set reference value. In the case where the guide line and the clock bits are recorded as marks having a reflectivity lower than the background or where they are recorded in a negative pattern, it may be detected that the sum signal exceeds the preset reference value.

BEST MODE FOR CARRYING OUT THE INVENTION

Figure 1:
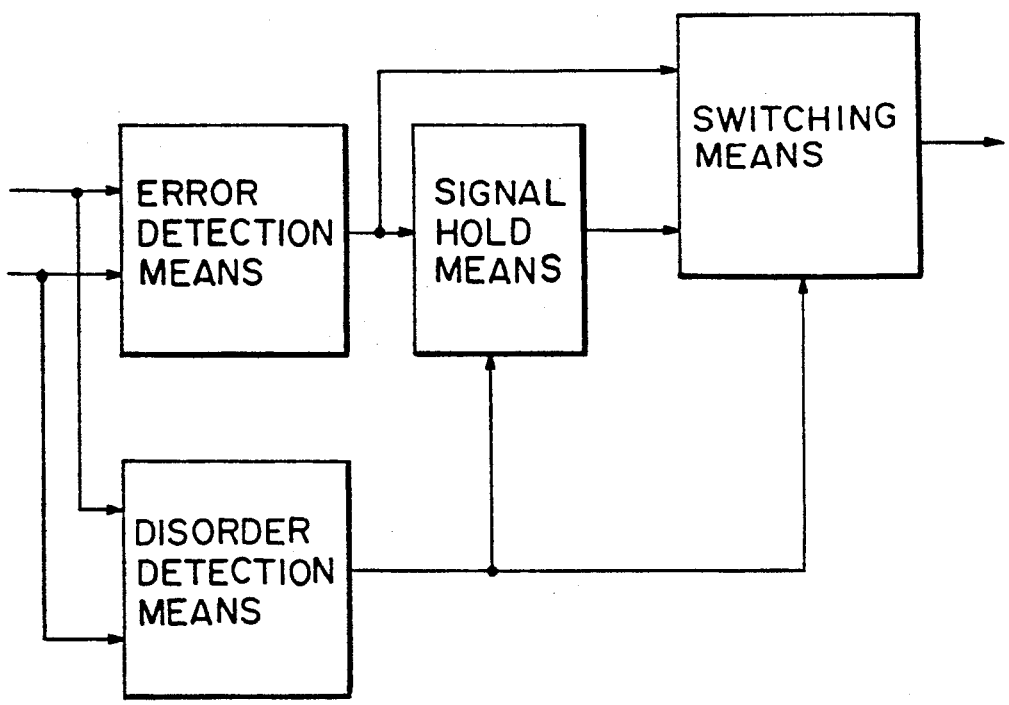
FIG. 1 is a block diagram showing a configuration of the present invention.

Embodiments of the present invention will now be described, while referring to the drawings. In the drawings, the same parts or portions are denoted by the same numerals.

In the following, the description is made, referring to the scanning of an optical system with respect to the optical recording medium. However, the present invention may also be operative in such a system that the optical recording medium is scanned with respect to the optical system. Only preferable examples of the recording format for a recording medium and a photodetector are exemplarily shown in the following embodiments, but the present invention may also be applicable to other configurations.

Prior to describing the embodiments of the present invention, explanation will be given for an example of the apparatus for which an error signal generating circuit of the present invention is utilized.

(Example of the Apparatus Utilizing the Invention)

Figure 4:
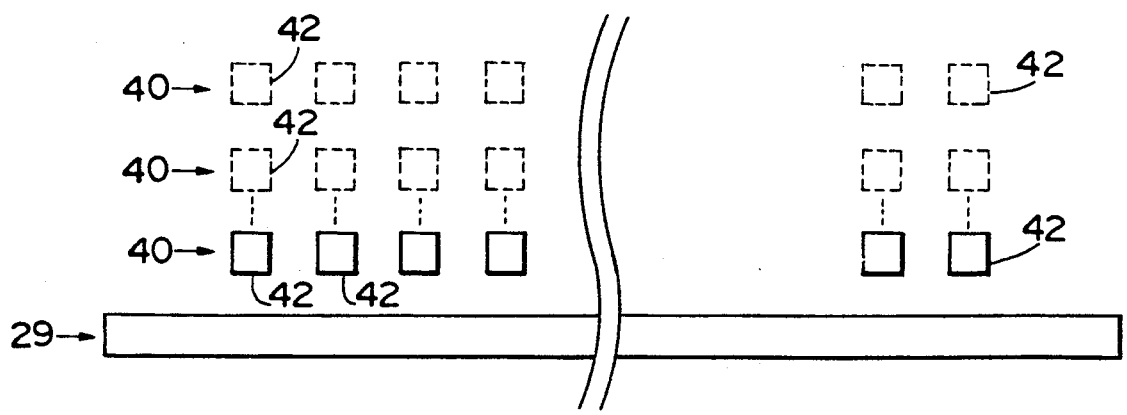
FIG. 4 is an explanatory view showing one example of a recording format for the card type optical recording medium usable with the photodetector of FIG. 3.

FIG. 4 shows one example of a recording format for a card type optical recording medium or so-called optical memory card. In this example, a plurality of data tracks 40 are juxtaposed for a tracking guide line 29. Each data track 40 is formed of a plurality of data bits 42. One of the data tracks 40 may be used as a clock track in which clock bits are recorded at equal intervals.

Figure 5:
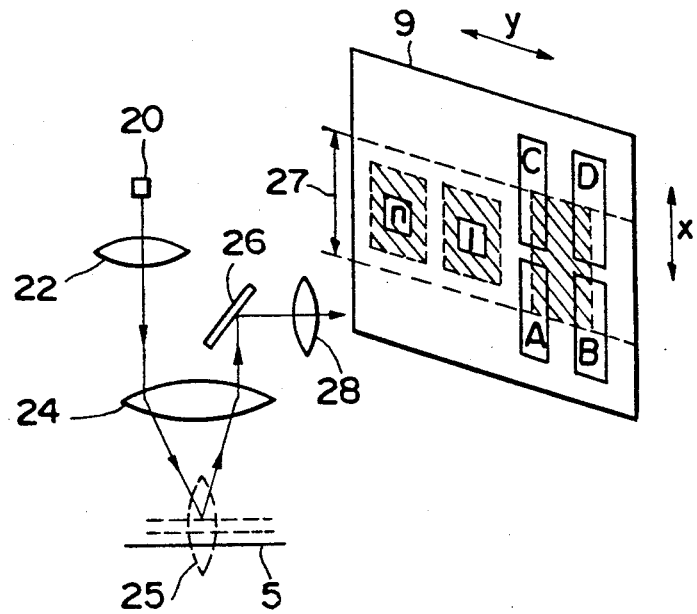
FIG. 5 is an explanatory view showing a reading apparatus for reading data on the card type optical recording medium of FIG. 4 by using the photodetector of FIG. 3.

FIG. 5 is an explanatory view showing a principle of the reading apparatus for reading data recorded on an optical memory card 5 having the format as shown in FIG. 4.

In FIG. 5, light from a light source, i.e., light emitting diode 20 is confined into parallel beams by a collimator lens 22 and converged, by an objective lens, into an ellipse 25 in which one or more clock bits and plural data bits corresponding thereto on the reading surface of the optical memory card 5 are included. Light reflected from the card 5 is transmitted through the objective lens 24.

The light source employable in the present embodiment is not limited to a light emitting diode. The present embodiment may employ plural light sources. Light transmitted through the objective lens 24 is reflected by a reflector 26 towards an objective lens 28. This reflected light forms an enlarged image of light by the objective lens 28 within an image forming range 27 including an array of light-sensitive elements of the photodetector 9.

Figure 3:
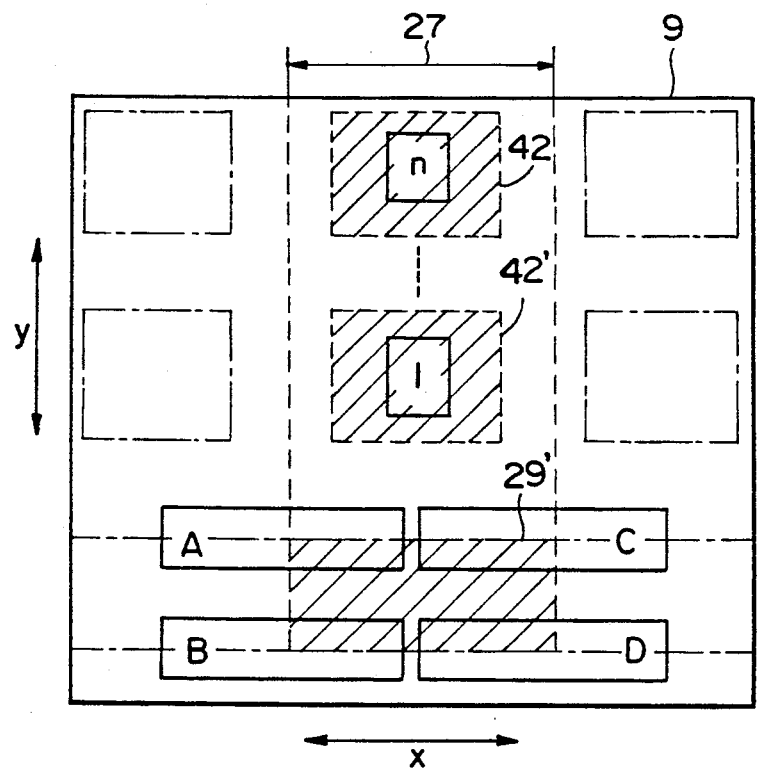
FIG. 3 is an enlarged front view of one example of a photodetector for a card type optical recording medium to which the present invention is applicable.

FIG. 3 is an enlarged front view of the photodetector 9 according to the present invention. The photodetector 9 comprises light-sensitive elements A, B, C and D and n light-sensitive elements 1 to n which are integrated on a single substrate. Each of the light-sensitive elements may be a photodiode, a charge-coupled device, etc. With a view to attaining a high-speed operation, a (PIN) photodiode is preferable.

In FIG. 1, the light-sensitive elements A and C, which are a first and a third element, respectively, are disposed in a direction x in which the image of light is moved relative to the optical memory card. The light-sensitive elements B and D, which are a third and fourth element, are disposed in the x direction in parallel with the first and second light-sensitive elements. The first to fourth light-sensitive elements A to D receive a light image 29' of the tracking guide line 29.

n Light-sensitive elements 1 to n which constitute a fifth element are arranged in rows in a y direction beside the light-sensitive elements A and C (or B and D) to receive a light image 42' of the data bit 42 on the data track 40. The light images 29' and 42' move in the x direction within the image forming range 27 as the optical system scans in the track direction of the optical system. However, since the tracking guide line is continuous, the light image 29' always appears at a fixed position in the x direction so long as the focussing is in good order. In the figure, each of dot-dash-lines indicates a position where a light image will be formed if it is within an image forming range.

Figure 6:
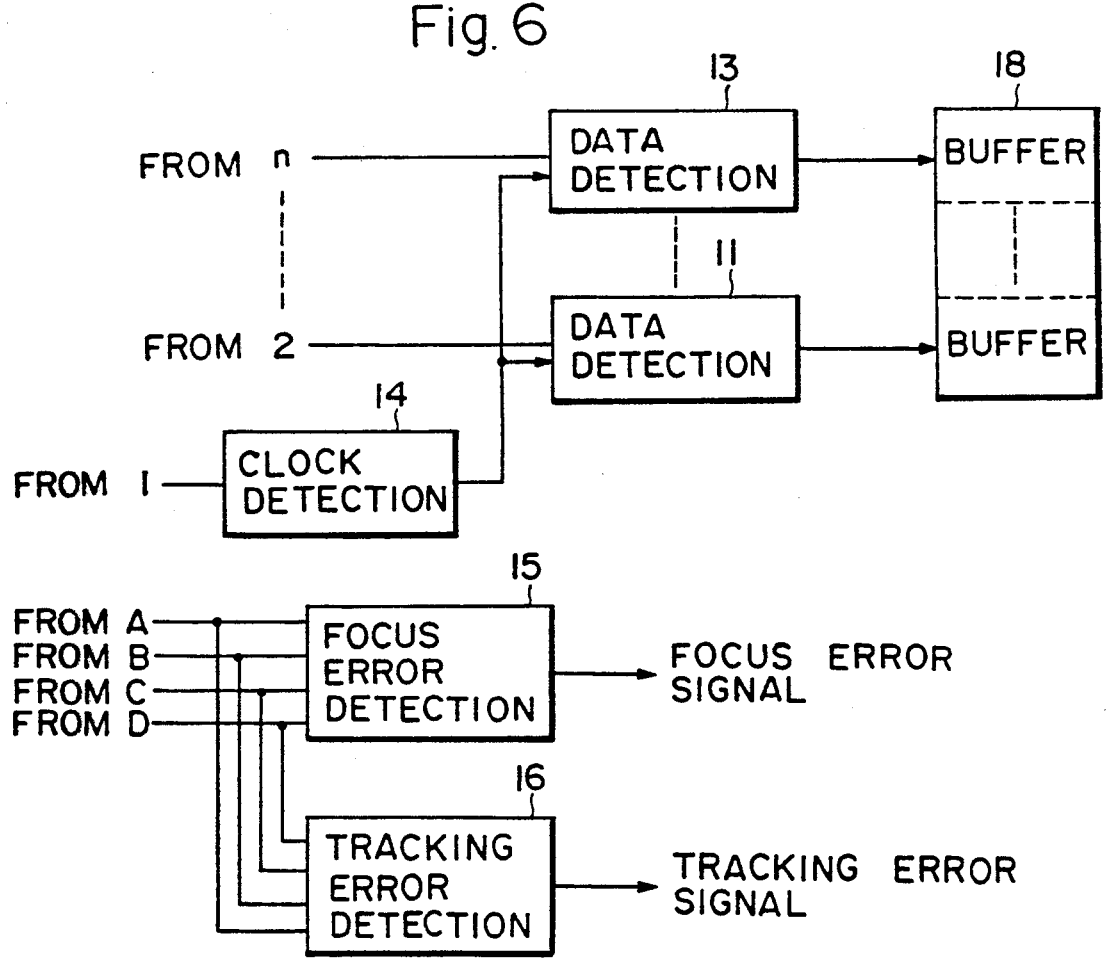
FIG. 6 is a block diagram of a processing unit for processing an output from the photodetector of FIG. 3.

FIG. 6 is a block diagram of an apparatus for processing an output from each of the light-sensitive elements of the photodetector 9 shown in FIG. 3. This apparatus comprises a clock detecting circuit 14 which is responsive to an output from the light-sensitive element 1 to encode it into a binary code for outputting a clock signal, data detecting circuits responsive to outputs from the light-sensitive elements 2 to n to encode the same into a binary code according to the clock signal; buffers 18 for storing these outputs, respectively, a focus error detecting circuit 15 which is responsive to outputs from the light-sensitive elements A to D to output a focus error signal to a focus control mechanism for the optical system, and a tracking error detecting circuit 16 which is responsive to outputs from the light-sensitive elements A to D to output a tracking error signal to a tracking control mechanism for the optical system.

(Focus Error Detecting Circuit and Tracking Error Detecting Circuit)

Figure 7:
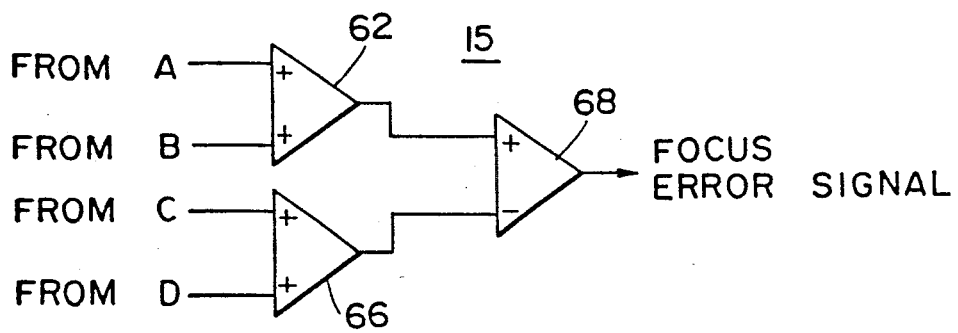
FIGS. 7A-D are block diagrams showing one example of a focus error detecting circuit of FIG. 6.
Figure 8:
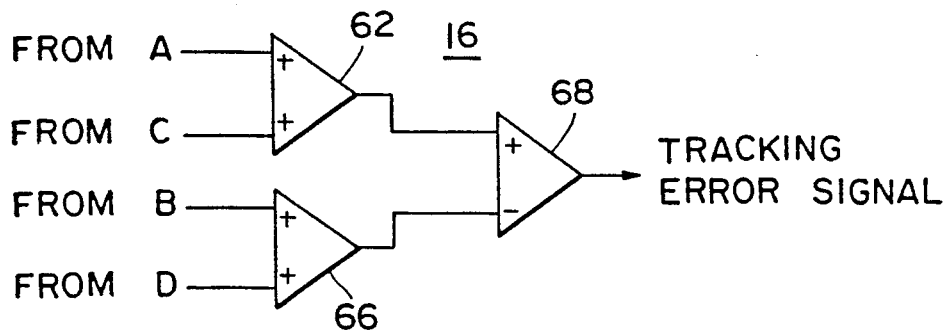
FIGS. 8A-D are block diagrams showing one example of a tracking error detecting circuit of FIG. 6.

FIGS. 7 and 8 show specific examples of the focus error detecting circuit 15 and the tracking error detecting circuit 16 shown in FIG. 6. Each of the focus error detecting circuit 15 and the tracking error detecting circuit 16 comprises summing amplifiers 62 and 66 and a differential amplifier 68 which receives outputs from the summing amplifiers 62 and 66. The circuits 15 and 16, however, differ from each other in that the summing amplifiers 62 and 66 receive outputs from different combination of light-sensitive elements. More particularly, in the focus error detecting circuit 15 of FIG. 7, the summing amplifier 62 receive outputs from the light-sensitive elements A and B and the summing amplifier 66 receive outputs from the light-sensitive elements C and D. In response to these outputs, the differential amplifier 68 outputs a focus error signal. Whereas, in the tracking error detecting circuit 16 of FIG. 8, the summing amplifier 62 receives outputs from the light-sensitive elements A and C and the summing amplifier 66 receives outputs from the light-sensitive elements B and D. As a result of this, the differential amplifier 68 outputs a tracking error signal.

It will now be described how the focussing control and the tracking control are carried out, based on the outputs from the light-sensitive elements A to D.

(Focus Control)

With respect to the focussing control, when the focussing of light beam with respect to the optical memory card 5 is normal, the light system is so adjusted that the light image 29' formed on the surface of the photodetector 9 is situated equally over the light-sensitive elements A, B and the light-sensitive elements C, D. At this time, $A+B=C+D$ (for convenience of explanation, the levels of the outputs of the light-sensitive elements A to D are expressed as A to D). Therefore, a focus error signal is not output from the focus error detecting circuit 15 of FIG. 7. In this connection, it is to be noted that, as illustrated in FIG. 5, in an off-center focussing control, the position where light beam is reflected by the optical memory card 5 is deviated in a direction along the track when the focus is changed upon fluctuation in the distance between the object lens and the optical memory card 5. As a result of this, the light image 29' (to say more strictly, the image forming range 27) is also deviated in the x direction. As a result of this, $A+B$ will not be equal to $C+D$ any more, so that the focus error detecting circuit 15 will generate a focus error signal. In response to the focus error signal, the object lens 24 is moved in an optical axis direction.

(Tracking Control)

The light system is so adjusted that the light image 29' formed on the surface of the photodetector 9 is situated equally over the light-sensitive elements A, C and the light-sensitive elements B, D as illustrated in FIG. 1 when the tracking of light beam with respect to the optical card memory 5. At this time, $A+C=B+D$. Therefore, a tracking error signal is not generated from the tracking error detecting circuit 15 of FIG. 7. However, when the tracking gets out of order, more specifically, when light beam is deviated with respect to the optical memory card 5 in a direction perpendicular to the track, the light image 29' formed on the surface of the photodetector 9 is also deviated in the y direction. As a result of this, $A+C$ will not be equal to $B+D$ any more, so that a tracking error signal is generated from the tracking error detecting circuit 15. In response to the tracking error signal, the position or the angle of the object lens 24 is controlled in a direction perpendicular to the track.

(Another Example Utilizing the Invention)

Figure 9:
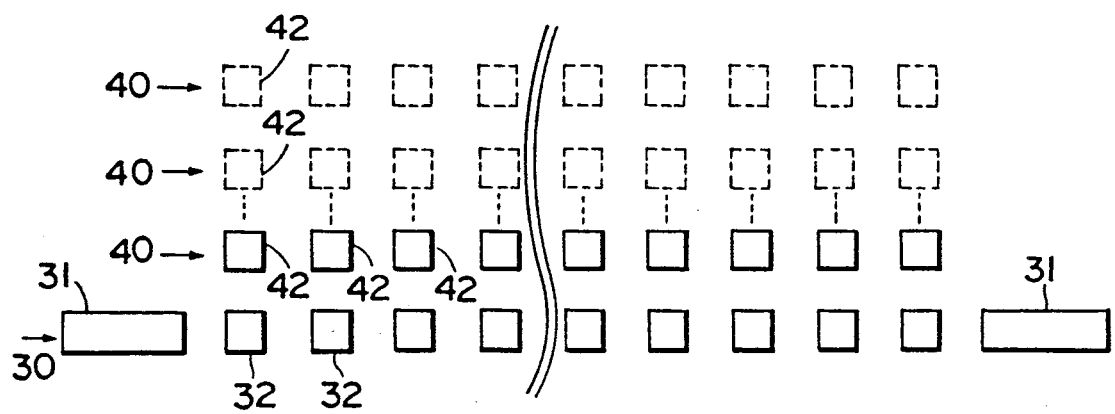
FIG. 9 is an explanatory view showing one example of another recording format for the card type optical recording medium.

FIG. 9 shows another example of a recording format for the card type optical recording medium. This recording format may be used with the photodetector 9. This format differs from the format of FIG. 4 in that tracking guide line 30 is also used as a clock track. The data bits 42 are recorded on the data track 40 at positions corresponding to the clock bits 32 of the clock track/guide line 30 as in FIG. 4. The clock track 30 has, at its ends, read-in marks 31 to facilitate tracking at the start of reading. The read-in mark 31 is made by forming plural clock bits without intervals.

Figure 10A:
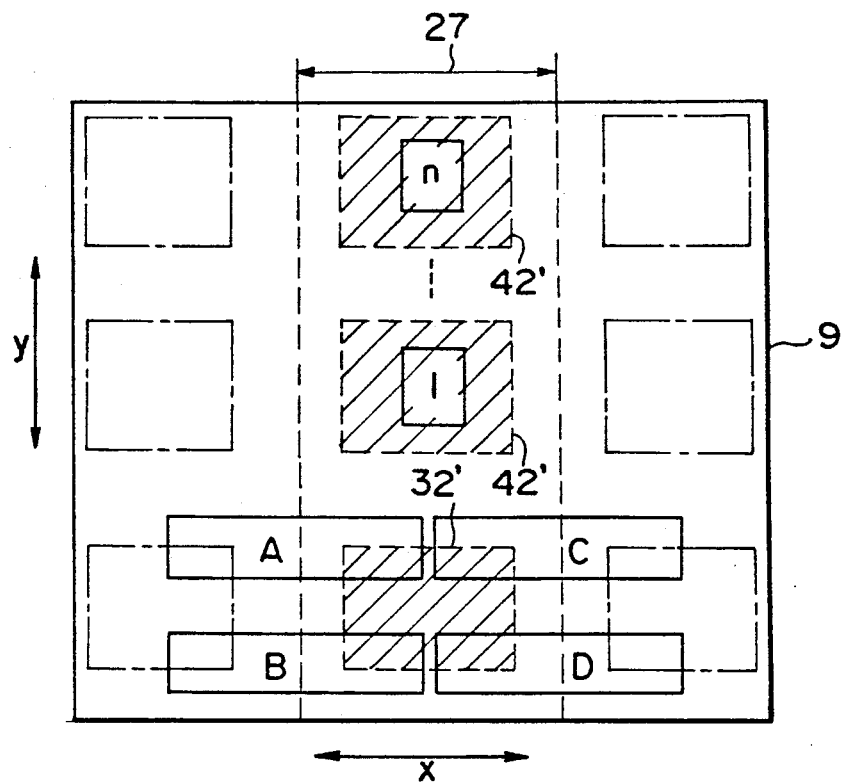
FIGS. 10A and 10B are explanatory views showing an operation when the photodetector of FIG. 3 is used with the optical recording medium of FIG. 9.
Figure 10B:
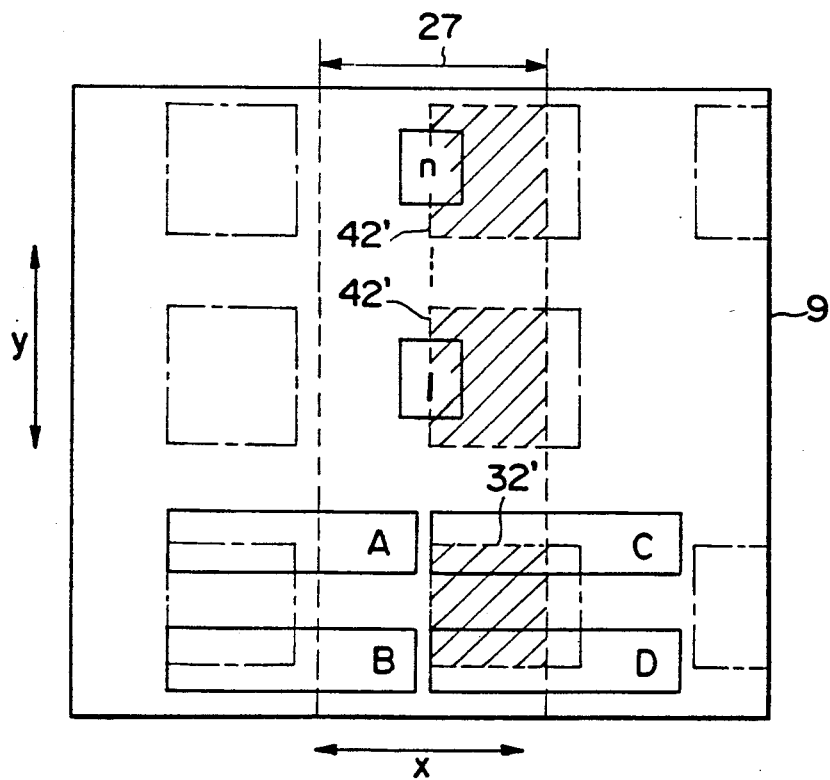

Light images 32' and 42' of the clock bit 32 and the data bit 42 of the optical memory card having the format of FIG. 9 on the photodetector 9 appear within its image forming range 27 as illustrated in FIG. 10A. In this connection, it is to be noted that since the clock track/guide line 30 of FIG. 9 is discontinuous, the light image 32' moves from its position of FIG. 10A to its position of FIG. 10B in the direction of the track together with the light image 42 as the optical system scans in the track direction (in other words, a dark and bright pattern shifts within the image forming range 27). Therefore, in the format of FIG. 9, the focus error signal represented by $(A+B)-(C+D)$ varies according to the scanning of the optical system even when the focussing is in good order. However, since fluctuation of the focussing is of a lower frequency than fluctuation of the focussing error signal, a low-pass filter (not shown) may further be provided on an output side of the differential amplifier 68 of the focus error detecting circuit 15 shown in FIG. 7 to solve the problem. With respect to the tracking, since the tracking error signal is proportional to $(A+C)-(B+D)$, there is no problem for the format of FIG. 9.

Since the photodetector 9 of FIG. 3 uses the light-sensitive elements A to D in common for error signal detection for both the focussing and the tracking and it is adapted to detect a plurality of data tracks at the same time, the detector may be constructed compact. As a result of this, the optical system may also be small-sized. In especial, if all the light-sensitive elements are integrated on one substrate, the small-sization is further enhanced. Besides, the characteristics of the elements can be uniform and the reading accuracy is further improved.

Figure 11:
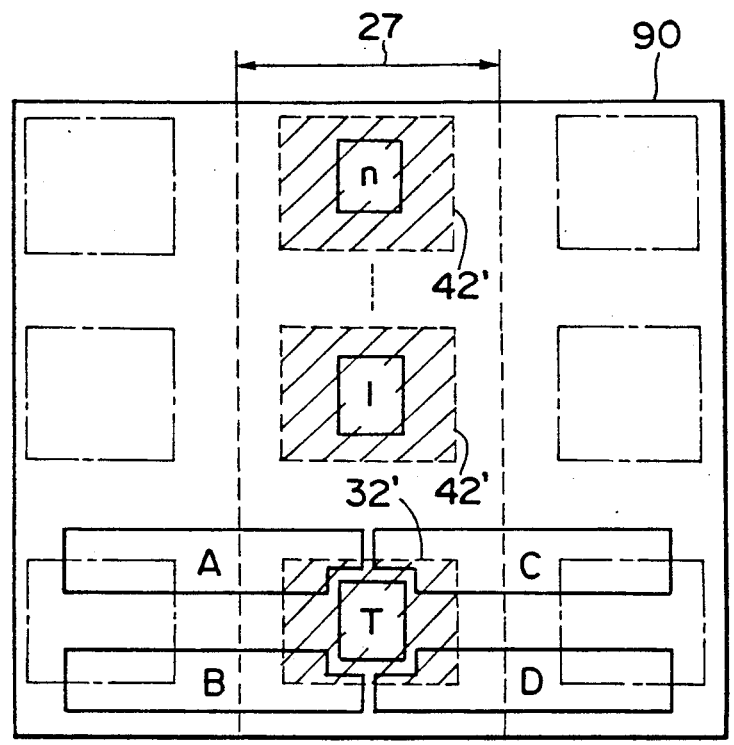
FIG. 11 is an enlarged front view of another example of the photodetector for the card type optical recording medium.
Figure 12:
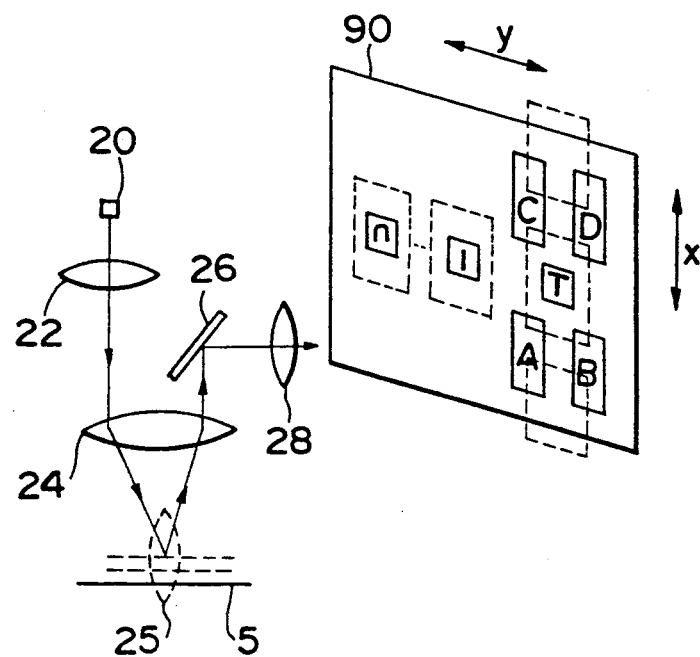
FIG. 12 is an explanatory view showing a reading apparatus for reading data from the card type optical recording medium of FIG. 9 by the photodetector of FIG. 11.

FIG. 11 illustrates another photodetector 90. The photodetector 90 may suitably be used for the card type optical recording medium having the format of FIG. 9.

Figure 13:
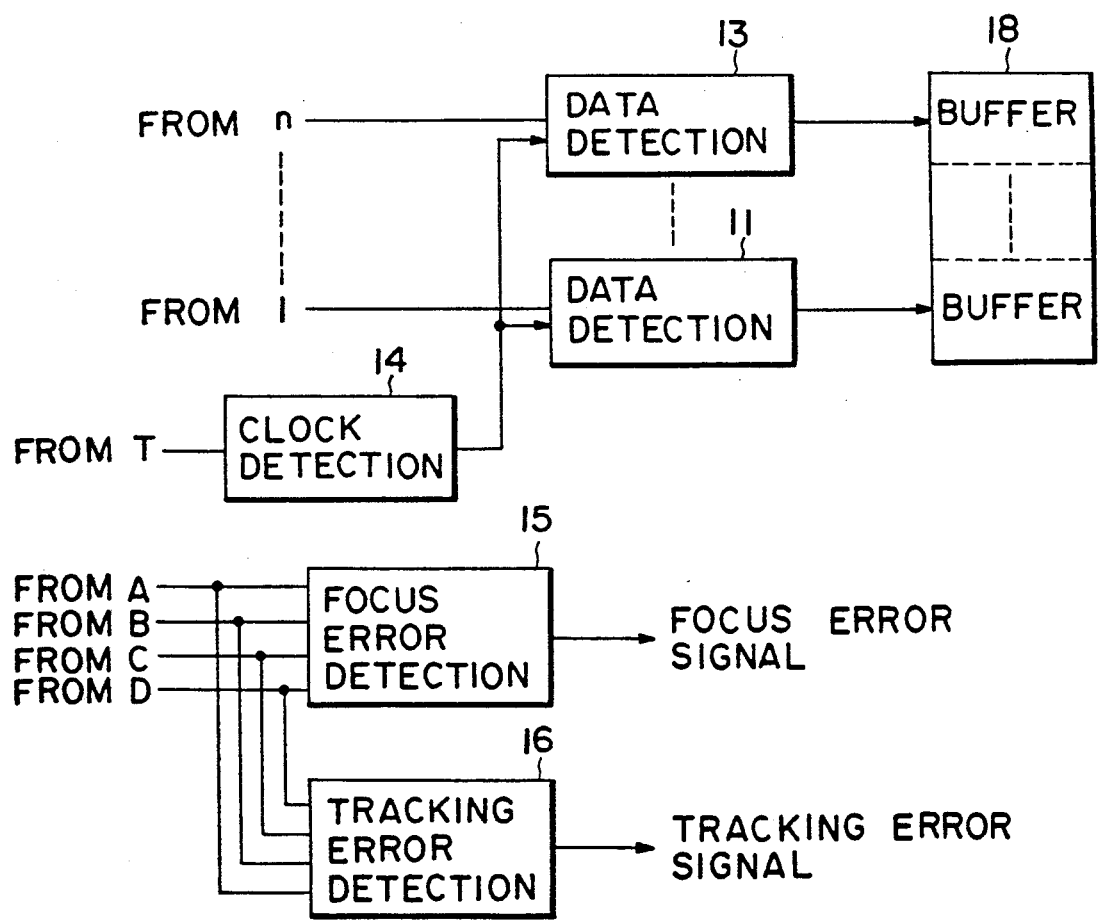
FIG. 13 is a block diagram of a processing unit for processing an output from the optical recording medium of FIG. 11.

The photodetector 90 of FIG. 11 differs from the photodetector 9 of FIG. 3 in that a sixth light-sensitive element T is provided in a region surrounded by the light-sensitive elements A to D. The light-sensitive element T is for detecting the clock bit 32 of the clock track/guide line 30. More specifically, the light-sensitive element T detects a light image 32' of the clock bit 32 which moves in the direction of the track according to the scanning of the optical system. The so obtained detection signal is encoded into a binary code by the clock detection circuit 14 as illustrated in FIG. 13 and supplied as a clock signal to the data detection circuits 11 to 13. Thus, all the tracks 40 in FIG. 9 can be utilized as data tracks.

The generation of the focus error signal and the tracking error signal according to the outputs from the light-sensitive elements A to D of the photodetector 90 and the focus control and the tracking control by the error signals are effected in manners as described above.

The error signal generating circuit according to the present invention may be applied to the focus error detecting circuit or the tracking error detecting circuit.

(Example of the Error Generating Circuit)

Figure 2:
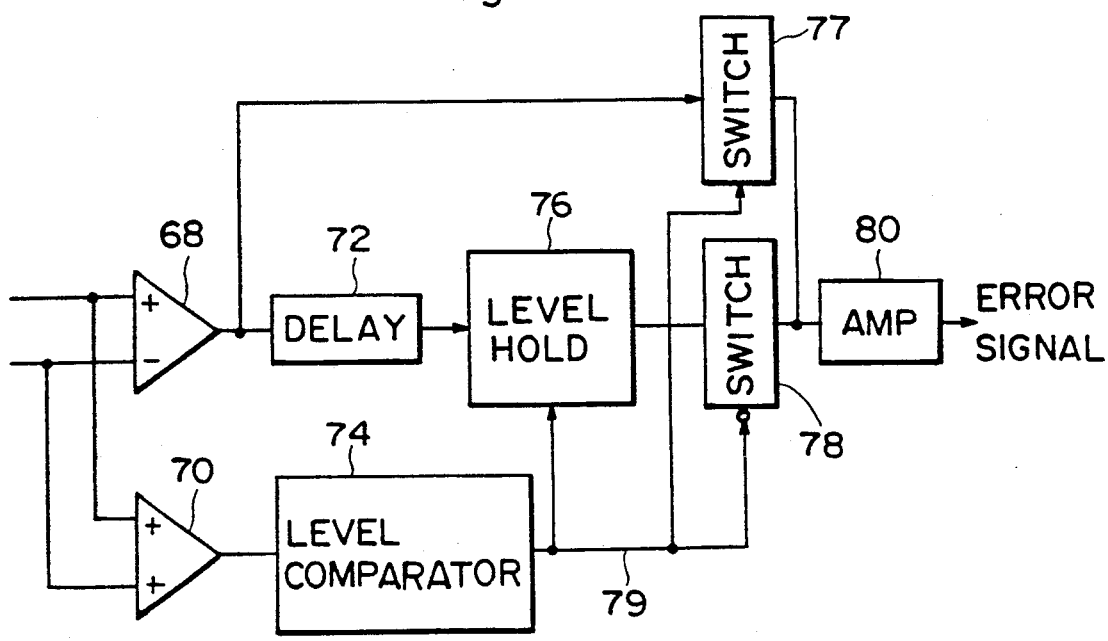
FIG. 2 is a block diagram of one embodiment of the present invention.

FIG. 2 is a block diagram of one form of the error signal generating circuit according to the present invention. This circuit comprising a differential amplifier 68, a summing amplifier 70, a delay element 72, a level comparator 74, a level hold circuit 76, switches 77, 78, and an amplifier 80.

The differential amplifier 68 of FIG. 2 constitutes an error detection means and receives an output from the summing amplifier 62 and an output from the summing amplifier 66 as the differential amplifier 68 of FIG. 8. Alternatively, an input is directly applied to the differential amplifier 68 without using the summing amplifiers 62 and 66. An output from the differential amplifier 68 is delayed by a time predetermined by the delay element 72.

The input signals to the differential amplifier 68 are also input to the summing amplifier 70. As a result of this, a signal proportional to the sum will be output. This sum signal is compared with a reference level predetermined by the level comparator 74. When the sum signal is lower than the reference level, a disorder signal 79 ("low" signal) is output. Thus, the summing amplifier 70 and the level comparator 74 constitute a disorder detection means.

The level hold circuit 76 holds the level of the output from the delay element 72 at the time when it receives the disorder signal 79 and maintains the holding state during the time when the disorder signal 79 is being generated. More specifically, the level hold circuit 76 and the delay element 72 function as a signal hold means for holding an output from the error detection means just before the disorder state.

The switch 77 is closed when no disorder signal 79 is generated to transmit the output from the differential amplifier 68 to the amplifier 80. More particularly, the switches 77 and 78 are so controlled that one of them may be opened when the other is closed. The output from the amplifier 80 is utilized as an error signal as described above.

(Operation of the Error Generating Circuit)

In the circuit of FIG. 2, the sum signal output from the summing amplifier is larger than the reference level of the level comparator 74 in good order where light is incident upon a photodetector for error detection and no disorder signal 79 is generated. Therefore, the switch 77 is closed and the output from the differential amplifier 68 is output as an error signal through the amplifier 80.

During the reading operation, if the amount of light incident upon the photodetector for the error detection is reduced due to dust etc. adhering to the surface of the optical memory card and the sum signal becomes lower than the reference level, the level comparator 74 outputs a disorder signal 79 of a "low" signal during the period. The level hold circuit 76 holds the level of the delay signal output from the delay element 72 at the time and maintains the holding state during the time when the disorder signal 79 is being generated. At the same time that the level hold circuit 76 holds the state in response to the disorder signal 79, the switch 76 is opened and the switch 78 is closed. As a result of this, the output from the level hold circuit 76 is output as an error signal through the amplifier 80. This error signal is used for a regular error signal during the disorder state is maintained.

When the cause of such a disorder state is eliminated and the amount of light incident upon the photodetector for the error detection is increased to such an extent that the sum signal exceeds the reference level, the generation of the disorder signal 79 is stopped. Then, the switch 78 is opened and the switch 77 is closed to restore the original state.

Although the foregoing description is given only for the preferred embodiment of the present invention, the present invention is not limited to it. For example, the disorder signal 79 of the level comparator 74 is "low" in the foregoing embodiment, it may alternatively be "high". In this case, the level hold circuit 76 may carry out the holding operation at the "high" level and the operations of the switches 77 and 78 may be vice versa.

What is claimed is:

1. An error signal generating circuit which generates an error signal based on a read signal from an optical recording medium, which circuit comprises:

an error detection means which receives the read signal and supplies an output of it as an error signal;

a disorder detection means having a summing amplifier which receives the read signal and also having a level comparator which checks the output level of the summing amplifier and detects a read disorder;

a signal hold means having a delay element for delaying the output from the error detection means for a predetermined time and a level hold circuit for holding an output level of the delay element and for holding an output of the error detection means which was present just before the read disorder state was detected and which the delay element outputs during a period when the output from the disorder detection means represents the disorderly state; and a switching means to receive an output of the error detection means and to receive an output of the signal hold means to supply an output of the error detection means from the signal hold means which was present just before the disorderly state occurred upon receipt of the disorder detection means as a trigger when the output from the disorder detection means represents the existence of a disorderly state and the output from the error detection means when the output from the disorder detection does not represent the existence of a disorderly state.

2. An error signal generating circuit as claimed in claim 1, in which said error signal is a signal for controlling the focus of light irradiated onto the optical recording medium.

3. An error signal generating circuit as claimed in claim 1, in which said error signal is a signal for controlling the tracking of light irradiated onto the optical recording medium.

4. An error signal generating circuit as claimed in claim 1, in which said signal hold means comprises a delay element for delaying the output from the error detection means for a predetermined time and a level hold circuit for holding an output level of the delay element when the disorderly state is detected by the disorder detection means.

* * * * *